United States Patent [19]
Nelson et al.

[11] Patent Number: 5,819,096
[45] Date of Patent: Oct. 6, 1998

[54] PCI TO ISA INTERRUPT PROTOCOL CONVERTER AND SELECTION MECHANISM

[75] Inventors: Albert R. Nelson; Aniruddha Kundu, both of Hillsboro, Oreg.

[73] Assignee: Intel Corporation, Santa Clara, Calif.

[21] Appl. No.: 893,447

[22] Filed: Jul. 11, 1997

Related U.S. Application Data

[63] Continuation of Ser. No. 791,004, Jan. 27, 1997, abandoned, which is a continuation of Ser. No. 267,827, Jun. 28, 1994, abandoned.

[51] Int. Cl.[6] .................................................. G06F 9/46
[52] U.S. Cl. ........................................ 395/733; 395/734
[58] Field of Search .................................. 395/725, 325, 395/500, 775

[56] References Cited

U.S. PATENT DOCUMENTS

| | | | |
|---|---|---|---|
| 4,837,239 | 6/1989 | McGill et al. | 364/900 |
| 4,890,219 | 12/1989 | Heath et al. | 395/500 |
| 5,187,781 | 2/1993 | Heath | 395/325 |
| 5,218,690 | 6/1993 | Boioli et al. | 395/500 |
| 5,261,107 | 11/1993 | Klim et al. | 395/725 |
| 5,359,715 | 10/1994 | Heil et al. | 395/325 |
| 5,367,689 | 11/1994 | Mayer et al. | 395/775 |

*Primary Examiner*—Ayaz R. Sheikh
*Assistant Examiner*—David A. Wiley
*Attorney, Agent, or Firm*—Blakely, Sokoloff, Taylor & Zafman

[57] ABSTRACT

An interrupt handling mechanism for converting PCI agent interrupts into interrupts compliant with a secondary bus standard interrupt protocol. PCI agent interrupts are processed by programmable logic for converting PCI compliant interrupts into, for example, ISA bus standard compliant interrupts for processing by a computer system which implements both a PCI bus and ISA bus. A programmable register provides for selecting which ISA interrupt will be generated by the programmable logic in response to a PCI agent interrupt.

22 Claims, 4 Drawing Sheets

PCI TO ISA INTERRUPT PROTOCOL CONVERTER AND SELECTION MECHANISM

This is a continuation of application Ser. No. 08/791,004, filed Jan. 27, 1997 now abandoned, which is a continuation of application Ser. No. 08/267,827, filed Jun. 28, 1994 now abandoned.

BACKGROUND OF THE INVENTION

1. Field of the Invention

The present invention relates to computer system peripheral connections. More particularly, the present invention relates to interrupt handling for computer systems having multiple peripheral buses.

2. Reservation of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Art Background

In the computer industry, one widely accepted system architecture for stand alone systems has been the AT system design. Computer system motherboards supporting this system type generally include a standardized input/output (I/O) bus for providing inter-system communications between the various system components. For example, the system's central processing unit (CPU) will utilize this bus for retrieving and writing data to the system's hard disk drive or other storage devices. Such system bus standards include the well-known ISA and EISA standards to which, for example, a hard disk drive may be connected through an Integrated Drive Electronics (IDE) interface.

As computer processor technology has developed, the traditional ISA, EISA and other I/O bus standards have proven inadequate to serve computer systems with advanced processors. There has recently been introduced a new I/O bus standard for use as a primary I/O bus which provides a much greater bandwidth than previously existing bus standards. The Peripheral Component Interconnect (PCI) bus is quickly receiving wide acceptance in the computer industry. The PCI bus standard provides for a high bandwidth and a flexibility that is independent of new processor technologies and increased processor speed. At this time, computer system architects are primarily designing speed sensitive peripherals such as graphics accelerators and SCSI disk drive controllers to be utilized with the PCI bus.

Computer system's designed today that incorporate PCI bus capabilities generally also include a slower, secondary I/O bus such as the ones described above, for compatibility with numerous existing, previously designed peripheral devices. There are a number of differences between the PCI bus standard and the previous I/O bus standards, particularly with respect to the various interrupt protocols. For example, the EISA/ISA bus architectures provides for 16 interrupt signals, IRQ[0:15] with each designated for different possible uses. The PCI bus on the other hand provides for four shared interrupts, INTR[A:D], with each shared by all slots on the PCI bus.

The different interrupt protocols for the two bus standards described above goes deeper than the number and naming of those designated interrupts. The greater difficulty in reconciling interrupts in a computer system architecture having both a PCI bus and ISA bus is that the PCI interrupts are defined to be active low, level sensitive interrupts while the ISA bus specification defines interrupts to be low-to-high, edge sensitive interrupts. The PC AT compatible interrupt structure, through a master/slave interrupt controller pair, supports sixteen active high edge sensitive interrupts. Out of these possible sixteen interrupts, an AT system dedicates five for bare minimum configurations, an additional six are used in a normal system environment having floppy and IDE drive support, two serial ports, a parallel port and PS/2 mouse support, leaving only five available for use with add-in cards.

The PCI bus specification requires four active low, level sensitive interrupt pins for each slot supported and defines their use as hardware shareable. That means that multiple PCI devices can drive the same interrupt line or that multiple PCI interrupt lines can be driven by different devices but may result in a single interrupt being generated to the system interrupt controller to be serviced by a shared interrupt driver.

Due to the small number of available interrupts in a PC AT system coupled with the addition of PCI based add-in cards, it can be seen that an interrupt sharing technique is clearly needed. It would be advantageous, and is therefore an object of the present invention, to provide a mechanism for integrating dissimilar interrupt protocols into a computer system for enhanced computer system operation.

SUMMARY OF THE PRESENT INVENTION

From the foregoing it can be appreciated that a computer system's performance may be enhanced by providing a mechanism for handling interrupts generated according to differing interrupt protocols. Accordingly, it is an object of the present invention to provide a method and apparatus for integrating interrupts generated in accordance with dissimilar interrupt protocols. Particularly, it is an object of the present invention to provide a level-to-edge conversion mechanism for integrating interrupts compliant with the PCI bus standard in a computer system having a secondary I/O bus and already equipped for handling interrupts generated by agents on the secondary I/O bus. These and other objects of the present invention are provided by introducing interrupt conversion circuitry for processing interrupts generated by agents on the PCI bus.

In one embodiment of the present invention, a computer system is implemented having a PCI bus as a primary I/O bus and an ISA bus as a secondary I/O bus. A programmable logic device is coupled to receive interrupts generated by agents on the PCI bus. The programmable logic device serves to convert the active low, level sensitive interrupts compliant with the PCI standard to the low-to-high, edge sensitive interrupts defined by the ISA bus specification. PCI agent interrupts, once converted to the appropriate interrupt protocol, are then provided to the system's resident interrupt controller for notifying the CPU of a pending interrupt.

One embodiment of the present invention also includes a software (usually BIOS) writeable control register for selecting a particular ISA IRQ interrupt to provide to the system's interrupt controller. The control register provides select control lines to the interrupt conversion logic for selecting a desired IRQ line to be used in routing interrupts from the PCI bus to the interrupt controller. This facilitates the using of a single interrupt signal from the programmable logic device to the interrupt controller.

BRIEF DESCRIPTION OF THE DRAWINGS

The objects, features and advantages of the present invention will be apparent from the following detailed description in which.

DETAILED DESCRIPTION OF THE PRESENT INVENTION

A method and apparatus are provided for interrupt handling in a computer system having multiple I/O buses that follow differing interrupt protocols. In this detailed description, one embodiment of a computer system which includes both a PCI bus and an ISA bus is described. It should be understood that this is for the purpose of illustration and is not provided as a limitation in that the present invention may be practiced on other computer systems where it is desirable to utilize multiple buses that follow different interrupt protocols. Throughout this detailed description, numerous specific details are set forth such as particular signal names, bus protocols and logic device types, in order to provide a thorough understanding of the present invention. It will be appreciated by one having ordinary skill in the art that the present invention may be practiced without such specific details. In other instances, well-known components, structures and techniques have not been described in detail in order to avoid obscuring the subject matter of the present invention. In addition, signal names identified in this detailed description are not intended to imply the active state of a given signal (active high or active low) but are simply used to name interface signals for discussion.

Figure 1:
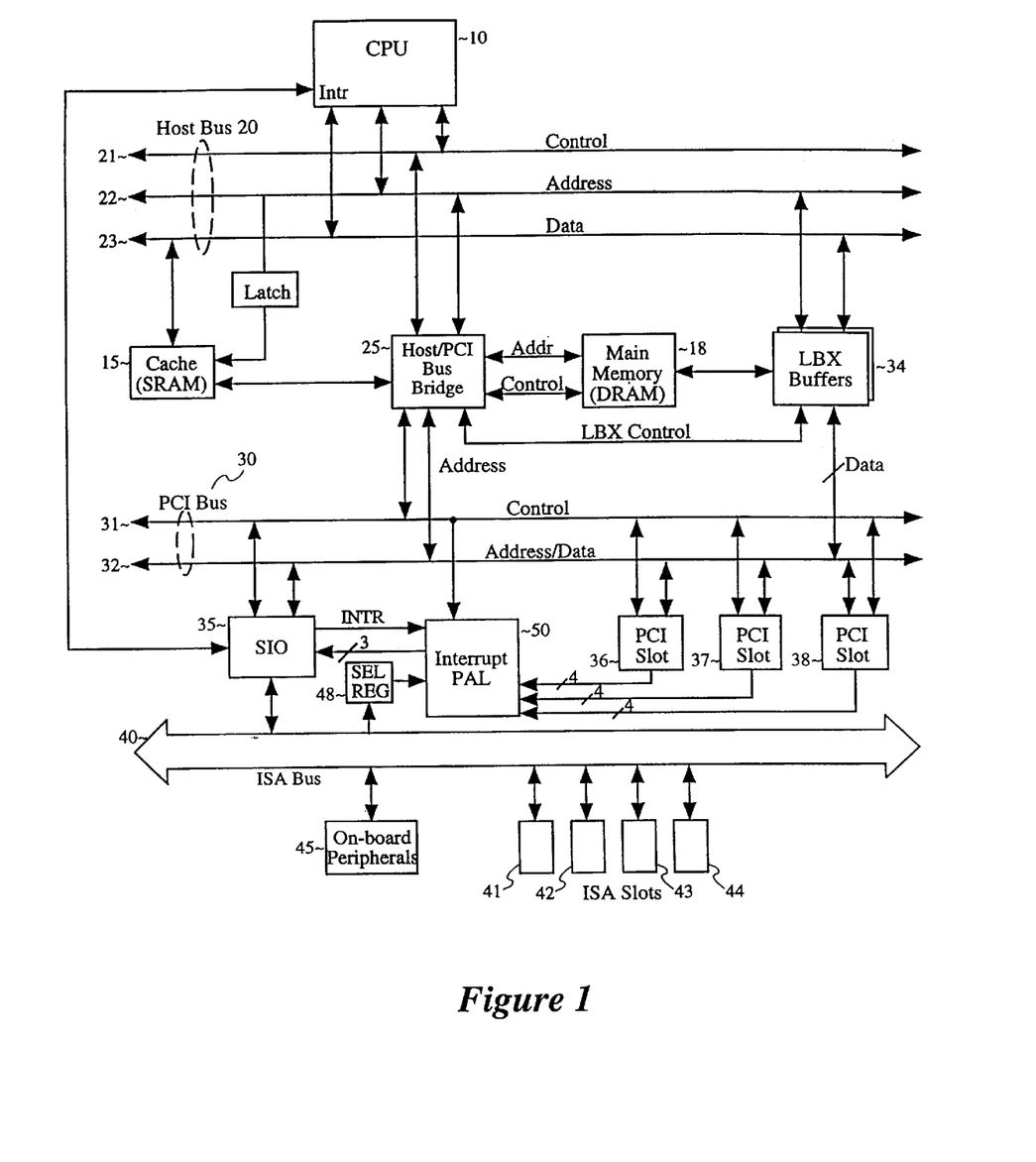
FIG. 1 illustrates a block diagram of a computer system architecture using a hierarchy of buses incorporating one embodiment of the present invention.

Referring now to FIG. 1, a computer system architecture which may incorporate the present invention is illustrated. The computer system architecture of FIG. 1 is illustrated so as to highlight the hierarchical bus organization of the architecture. It can be seen that the computer system's central processing unit (CPU) 10 communicates with its SRAM cache 15 over a Host bus 20. In one embodiment, the Host bus 20 includes control lines 21, address lines 22 and data lines 23. In other embodiments, the address and data lines may be multiplexed to share common signal paths. A Host bus is usually designed to meet the needs of high performance computing associated with whatever type of processor is implemented for CPU 10.

In some computer system architectures, the computer system's main memory will be directly coupled to the processor Host bus. In the illustrated implementation, the DRAM main memory 18 is coupled to the Host bus through the Host/PCI bus bridge 25. The Host/PCI bus bridge 25 is used as a bridge between the Host bus 20 and the system's PCI bus 30. The PCI bus, as described above, serves as the primary I/O bus for the computer system and was designed to address the growing industry needs for a standardized local bus that is not directly dependent on the speed and size of a computer system's processor bus. The PCI bus 30 as illustrated in FIG. 1 is shown separated into control lines 31 and address/data lines 32. The Host/PCI bus bridge 25 monitors the Host bus 20 and the PCI bus lines 31 and 32, and determines whether a transaction is designated for the computer system's main memory system 18 or whether a CPU request should be propagated down the hierarchy of buses, the next step being down to the PCI bus 30.

There is shown coupled to the PCI bus 30 in FIG. 1 three PCI slots 36, 37 and 38 for receiving peripheral devices designed to be compliant with the PCI bus standard. The computer system may, of course, employ any number of PCI slots and still incorporate the present invention. Such add-in cards may include graphics accelerators, disk drive controllers, and speed sensitive peripherals which may take advantage of the abilities of the PCI local bus 30. There is also shown coupled between the address/data lines 32 of the PCI bus and the Host bus a collection of buffers, denoted LBX buffers 34 which are used to buffer data transfers between the two buses 20 and 30. The LBX buffers 34 are implemented to compensate for the varying speeds that the two buses may be operating at and enhance system performance by allowing for concurrency between the Host bus 20 and PCI bus 30, giving each bus greater throughput and decreased latency. In alternative embodiments, the LBX buffers may be replaced by other buffering mechanisms so long as the data transferring functionality between the host bus, main memory and primary I/O bus is maintained.

There is finally shown in FIG. 1, a secondary I/O bus 40 which in the illustrated embodiment is a peripheral I/O bus compliant with the ISA bus standard. The teachings of the present invention may of course be extended to computer systems having other secondary I/O buses, such as an EISA bus or other bus having a different interrupt protocol than the PCI bus. Coupled to the ISA bus 40 are four I/O slots 41, 42, 43 and 44 which may be used for receiving various peripherals. On-board peripherals 45 such as floppy disk drives, hard disk drives equipped with an IDE standard interconnect, and other peripherals normally associated with computer systems are often designed right on the system's motherboard and do not require an I/O slot which are provided for other add-in card upgrades. The on-board peripherals 45 do electrically reside on the ISA bus 40. In general, the I/O bus 40 is a slower bus than the PCI bus 30 but is still included in newer computer systems to maintain compatibility with previously designed peripherals.

Having both an ISA bus and a PCI bus allows personal computer platforms built around the PCI bus as a primary I/O bus to leverage the large ISA product base. The ISA bus provides 24-bit addressing and a 16-bit datapath. An EISA I/O bus allows a personal computer platform built around the PCI bus as a primary I/O bus to leverage the large EISA/ISA product base. Along with compatibility for 16-bit and 8-bit ISA hardware and software, the EISA bus provides for 32-bit addressing and a 32-bit datapath. Of course, other secondary I/O buses may provide similar features.

Coupled between the PCI bus 30 and the ISA bus 40 of the computer architecture of FIG. 1 is illustrated a system I/O (SIO) component 35. The SIO component 35 provides the bridge between the PCI bus and the ISA bus and may incorporate the logic for interfacing the ISA bus 40 with the PCI bus 30 as well as incorporating support for any necessary DMA controllers and interrupt control logic. For example, if a traditional hard disk drive having an IDE interconnect is present in I/O slot 41 and that IDE drive requests a transaction with the CPU, the IDE drive will signal an interrupt, IRQ 14, which will be recognized as a primary hard disk drive access by the system. When the computer system recognizes an IRQ 14 interrupt, it will vector to the necessary code for accessing the hard disk drive.

In the computer architecture implemented according to FIG. 1, the SIO component 35 includes interrupt controllers, such as the Intel 82C59 interrupt controller, configured to be responsive to interrupts compliant with ISA bus interrupts. The SIO component 35 will resolve interrupts from various sources through programmable arbitration schemes and present a single interrupt to the CPU to act to execute an appropriate interrupt service routine.

As described, agents residing in a PCI slot on the PCI bus share four PCI designated, level sensitive interrupts. In the computer architecture configuration illustrated in FIG. 1, each of the PCI slots is coupled so that PCI agents will provide their interrupts to a programmable logic device identified as interrupt PAL 50. The configuration and programming of the interrupt PAL 50 will be described in more detail further herein. Essentially, the function of the interrupt PAL 50 is to convert the active low, level sensitive PCI interrupts into the low-to-high, edge sensitive interrupts required by the ISA bus standard. The interrupt PAL 50 provides the edge sensitive interrupt to the SIO component 35 in response to a PCI interrupt requested by any and all of the PCI agents.

It was noted above that various IRQ signals may be utilized for signaling an ISA interrupt to the SIO component 35. There is thus provided the software (usually BIOS) writeable control register 48 which controls select lines to the interrupt PAL 50 for directing which single IRQ signal to provide to the SIO component 35. In one embodiment the select lines are controlled by an IO write to the lower 2 bits of IO address 73$h$. Other registers or latches may be used for the storage element 48 and may reside at different IO or memory locations. The internal operation of the control register 48 and the interrupt PAL 50 will be described in more detail further herein.

Figure 2:
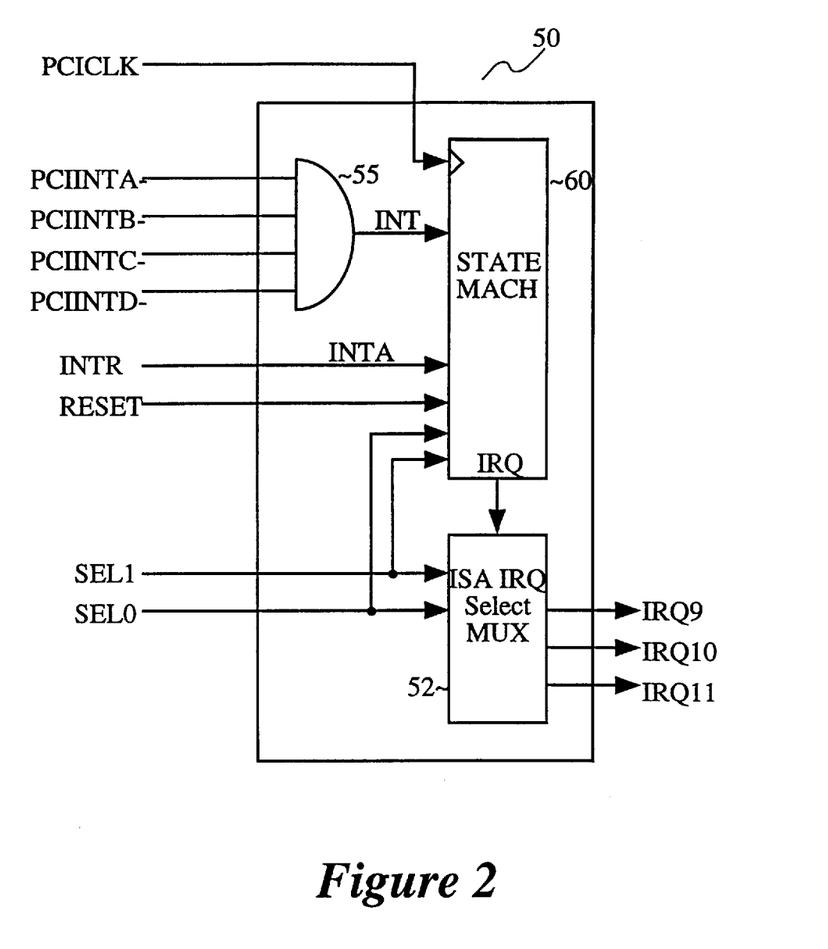
FIG. 2 illustrates a logic diagram indicating the inputs and outputs to the programmable logic to be implemented in one embodiment of the present invention.

Referring now to FIG. 2, a more detailed diagram of the interrupt PAL 50 as utilized by one embodiment of the present invention is illustrated. In one embodiment of the present invention, the programmable logic may comprise an 85C220 EPLD manufactured by the Intel Corporation. Of course, other programmable logic capable of executing the functionality to be described below may prove suitable for other implementations. The PAL 50 receives all of the shared interrupts from the PCI agents coupled to the PCI bus 30. The combined shared interrupts are OR'ed together by gate logic 55 and the result is provided to state machine 60 by a signal denoted INT. Thus, any PCI agent signaling any interrupt will cause the INT signal to go active to the state machine 60, which is clocked by a PCICLK signal.

The state machine logic 60 in the programmable logic block 50, in addition to receiving the PCICLK timing signal and the logical OR of the PCI agent interrupts, also receives the INTR signal from the SIO component 35, identified as INTA at the state machine side of the transaction and a system reset signal. In one embodiment, the EPLD is reset on pin 8 by the same signal that resets the entire ISA bus. The INTR signal supplied to the CPU from the SIO component 35 is the interrupt request generated by the SIO which causes the CPU to process an interrupt service routine (ISR). Upon completion of performance of an ISR, the CPU clears the INTR signal by writing an "end of interrupt" command to the SIO's interrupt controller interface.

The state machine logic 60 is also provided with the select control signals SEL0 and SEL1. In the illustrated embodiment, a PCI agent interrupt will be forwarded to the SIO component 35 (FIG. 1) through one of the IRQ lines: IRQ9, IRQ10 or IRQ11. The choice of which IRQ signal is provided to the SIO component 35 is determined by the bits set in the select register 48 (FIG. 1) which is writeable by the system's configuration software. Of course, other IRQ signals may be used for indicating a PCI interrupt to the SIO component 35. Note that if more than four possible IRQs are provided for, then more than two bits will be required to be set in the SEL register 48 and additional select lines to the PAL 50 will be required. The selected control bits, in addition to being provided to the state machine logic 60, are also provided to the ISA IRQ select multiplexer 52. When the state machine logic 60 sends an active IRQ signal as a control signal to the select multiplexer 52, the multiplexer 52 provides the selected IRQ signal to the SIO component 35 responsive to the select bits and the control signal. In one embodiment, one state of these bits is used to encode that no IRQ output to the SIO should occur. This is the reset state of the SEL REG 48, so at RESET the bits must be configured or no IRQ will be processed from PCI agents.

Figure 3:
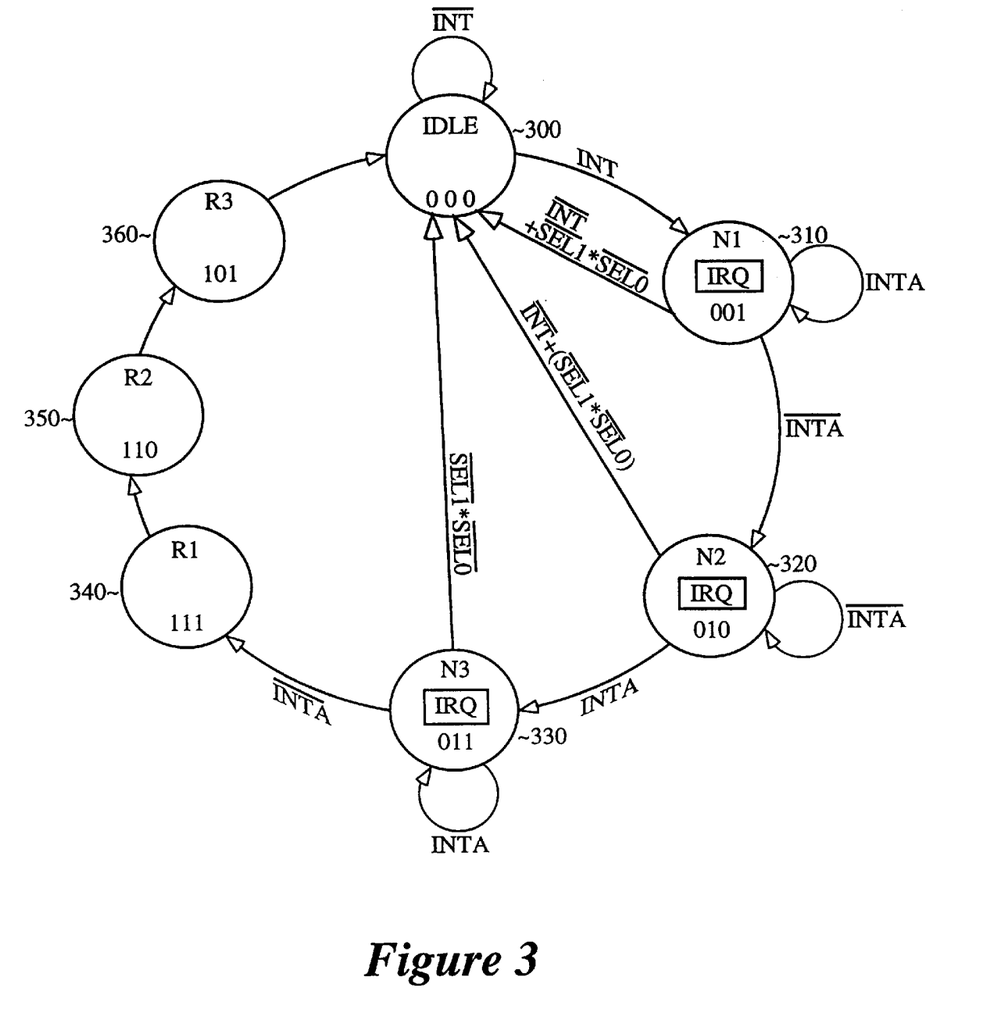
FIG. 3 illustrates a state diagram to be implemented by the programmable logic for converting PCI interrupts to ISA compliant interrupts by the programmable logic implemented in one embodiment of the present invention.

FIG. 3 illustrates a state diagram to be implemented by one embodiment of the state machine logic 60 illustrated in FIG. 2. Attached as a Appendix A to this disclosure is a listing of one embodiment of a program for programming the programmable logic device 50 to implement the state diagram shown in FIG. 3. Note that each state identifies a three digit control code at its bottom. These correspond to the values of state variables B2, B1 and B0, respectively, in each state as they are utilized throughout the source code listing attached as Appendix A.

The state machine diagram begins at idle state 300 upon reset. The state machine in this example is synchronous, transitioning from state-to-state on a PCICLK rising edge. The state machine remains in the idle state as long as the INT signal is inactive, indicating that no PCI interrupts are being asserted by any PCI agents.

When the INT signal goes active to the state machine 60, it transitions to N1 state 310 on the next PCICLK input. Once the state machine has achieved N1 state 310, it asserts the IRQ active signal to the ISA IRQ select multiplexer 52 for providing the selected IRQ to the SIO component 35. If the INTA signal is already active when the state machine logic is in N1 state 310, the state machine will remain in the N1 state. An active INTA signal when the state machine first achieves the N1 state indicates that the CPU is currently executing a previously requested interrupt service routine. The state machine will not transition from the N1 state 310 to the N2 state 320 until the INTA signal goes inactive, indicating that the CPU has completed handling the previously signaled interrupt.

The state machine may transition from the N1 state 310 back to the idle state 300 if the INT signal goes inactive while in the N1 state. This may indicate that the PCI agent requesting the interrupt no longer requires the interrupt to be handled by the CPU. This is not to be expected but may occur. Additionally, in the illustrated embodiment of the present invention, if both the SEL1 and SEL0 select bits go inactive, the state machine will return to the idle state 300. This may indicate a selection made by the operating system that no PCI interrupts are to be acknowledged. In alternative embodiments, null SEL1 and SEL0 values may be defined to indicate a particular IRQ signal, or a default IRQ signal.

Once the CPU has cleared the INTA signal, if it was active, the state machine transitions from the N1 state 310 to the N2 state 320 on the next PCICLK input. In this state, the IRQ signal continues to be driven from the programmable logic device 50 so long as the INT signal to the state machine logic remains active or the select signals do not go inactive.

The state machine remains in the N2 state 320 so long as the INTA signal remains inactive indicating that the CPU is not responding to any interrupt request. When the INTA signal again goes active, it indicates that the CPU is responding to an interrupt which may be the interrupt generated by the PCI agent, though it is possible that the CPU is responding to a different interrupt. When the INTA signal does go active, the state machine transitions to N3 state 330 where it remains as long as the INTA signal remains active. The state machine continues to provide the IRQ signal to the ISA IRQ select multiplexer 52 while in the N3 state. A deactivation of the SEL1 and SEL0 select controls will cause the machine to return to the idle state 300, otherwise the state machine will remain in the N3 state 330 as long as the INTA signal is active.

When the INTA signal again goes inactive, it indicates that the CPU has completed execution of an interrupt service routine (ISR) which may have been the ISR required by the PCI agent signaling the interrupt, though not necessarily. The state machine will then transition through R1 state 340, R2 state 350 and R2 state 360, residing in each state for one cycle of the PCICLK timing signal. During this period, the IRQ signal will no longer be active and the SIO component 35 will not be receiving an IRQ from the interrupt PAL 50.

From the R3 state 360, the state machine returns to the idle state 300. If the CPU has just executed an ISR for the PCI agent, the procedure should have cleared the PCI agent's interrupt request, then it is likely that the INT signal will be inactive. However, if the CPU had been responding to a different interrupt when the state machine was in N3 state 330, then it would have been a different ISR which caused the INTA signal to go inactive. In that event, it is expected that the INT signal is still an active input to the state machine 60, in which case the state machine will transition from the idle state 300 to the N1 state 310 to repeat the process described above on the next PCICLK input.

It should be understood that the series of states following the N3 state 330 through the R1, R2 and R3 states 340, 350 and 360, back through the idle state 300 and to the N1 state 310 provides a necessary delay. It is this delay and the switching off and back on of the IRQ signal from the interrupt PAL 50 that converts the PCI compliant level sensitive interrupt received by the interrupt PAL 50 to the low-to-high edge sensitive interrupt driven to the interrupt controller of the SIO component 35 as an ISA IRQ compliant signal.

Figure 4:
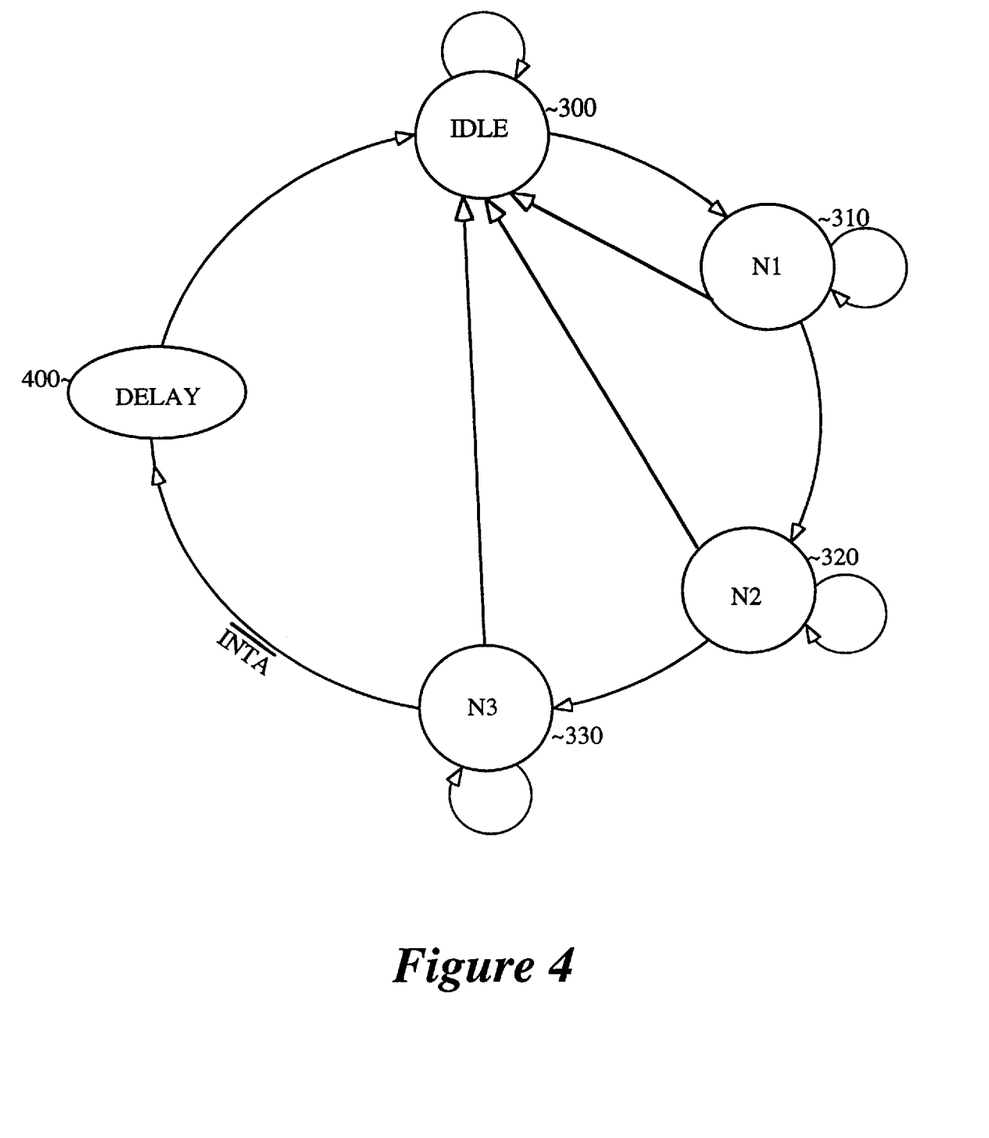
FIG. 4 illustrates another state diagram which may be implemented by the programmable logic for converting PCI interrupts to ISA compliant interrupts in another embodiment of the present invention.

FIG. 4 illustrates a more general state diagram to be implemented by one embodiment of state machine logic 60. The state diagram illustrated in FIG. 4 includes the states 300, 310, 320 and 330 described above with respect to FIG. 3. In FIG. 4, the R1, R2 and R3 states are replaced by delay state 400. The specific implementation of FIG. 3 required three PCI clock signals of delay before returning to the idle state 300 to ensure a proper placing of the high-to-low edge sensitive interrupt to the SIO component 35. In some embodiments, a different delay period may be required and is encompassed and accounted for by the delay state 400 incorporated in FIG. 4.

There has thus been described a mechanism for harmonizing dissimilar interrupt protocols in a computer system having more than one implemented I/O bus. Although the present invention has been described in terms of various embodiments, it will be appreciated by those skilled in the art that various modifications and alterations might be made without departing from the spirit and scope of the present invention. For example, it is possible to implement a programmable logic design using a clock other than the PCICLK. Similarly, an asynchronous implementation is conceivable. The invention should, therefore, be measured in terms of the claims which follow.

APPENDIX A

```
TITLE       PCI TO ISA INTERRUPT CONVERTER
PATTERN     PCIINT, xxxxxx-xxx
REVISION    01
AUTHOR      RN/AK
COMPANY     INTEL
DATE        9/13/93
; This device merges 4 low-true, level-sensitive interrupts from up to three
; PCI expansion slots into a single, edge-sensitive ISA interrupt. It also
; allows selection of one of three ISA interrupts through the SEL(1:0)
; inputs.
CHIP PCIINT  85C220
PIN 1 CLK    ; PCLK INPUT FROM PCMC
PIN 2 /INT1  ; PCI INTERRUPT INPUT
PIN 3 /INT2  ; PCI INTERRUPT INPUT
PIN 4 /INT3  ; PCI INTERRUPT INPUT
PIN 5 /INT4  ; PCI INTERRUPT INPUT
PIN 6 SEL1   ; ISA IRQ CONTROL BITS, ALSO USED TO RESET STATE MACHINE
PIN 7 SEL0   ; ISA IRQ CONTROL BITS, ALSO USED TO RESET STATE MACHINE
PIN 8 RESET  ; NOT ACTIVELY USED IN THIS DESIGN
PIN 9 INTR   ; THIS IS THE CPUs' INTERRUPT INPUT PIN, DRIVEN BY THE SIO
PIN 10 GND
PIN 11 /OE   ; USED BY ATE TESTER
PIN 12 IRQ9  ; ISA IRQ 9, ENABLED IF SELECTED BY SEL1,SEL0 BITS
PIN 13 IRQ10 ; ISA IRQ 10, ENABLED IF SELECTED BY SEL1,SEL0 BITS
PIN 14 B0    ; STATE MACHINE BIT
PIN 15 B1    ; STATE MACHINE BIT
PIN 16 B2    ; STATE MACHINE BIT
PIN 17 INTA  ; REGISTERED OUTPUT VERSION OF INTR
PIN 18 IRQ11 ; ISA IRQ 11, ENABLED IF SELECTED BY SEL1,SEL0 BITS
PIN 19 INT   ; REGISTERED OUTPUT RESULT OF OR'ING OF ALL PCI INTERRUPT PINS
PIN 20 VCC
EQUATIONS
```

-continued

APPENDIX A

| | |
|---|---|
| IRQ11.TRST = SEL1 * SEL0 | ; THE SELECT INPUTS DETERMINE THE CHOSEN ISA IRQ |
| IRQ10.TRST = SEL1 * /SEL0 | ; THE SELECT LINES ARE GUARANTEED TO BE LOW ATFER |
| IRQ9.TRST = /SEL1 * SEL0 | ; A BOARD RESET. |
| INT.TRST = VCC | ; THIS PIN IS ON OLD IRQ15, MUST CUT A TRACE. |
|   INTA := INTR | ; LATCHS CPUs INTR SIGNAL |
|   INT := INT1 | ; LATCHES ANY PCI INT REQUEST |
|     + INT2 | |
|     + INT3 | |
|     + INT4 | |
| IRQ9 = /B2 * (B1 + B0) | ; DRIVE IRQS IN STATES N1, N2, AND N3 ONLY |
| IRQ10 = /B2 * (B1 + B0) | |
| IRQ11 = /B2 * (B1 + B0) | |
| ;------------------------------------------------------------------------------- | |
| STATE | |
| MEALY_MACHINE | |

What is claimed is:

1. A computer system comprising:

a central processing unit (CPU);

a host bus coupled to the CPU for conveying signals to and from the CPU;

a first I/O bus coupled to the host bus, the first I/O bus being compatible with a first bus standard for providing a communications path between the CPU and peripheral devices, wherein interrupts propagated over the first I/O bus are of a first interrupt type;

a second I/O bus being compatible with a second bus standard wherein interrupts propagated over the second I/O bus are of a second interrupt type;

an interrupt controller coupled to the CPU and the second I/O bus, wherein the interrupt controller is responsive to interrupts of the second interrupt type, and wherein the interrupt controller signals interrupts to the CPU; and an interrupt converter coupled to said interrupt controller and responsive to interrupts of said first interrupt type generated by agents of said first I/O bus, said interrupt converter providing an interrupt of the second interrupt type to the interrupt controller in response to receiving an interrupt of the first interrupt type.

2. The computer system of claim 1 wherein interrupts of the first interrupt type are level sensitive interrupts and interrupts of the second interrupt type are edge sensitive interrupts.

3. The computer system of claim 2 wherein said interrupt converter comprises:

circuitry for performing a logical OR operation of a plurality of interrupt lines from a plurality of agents on the first I/O bus; and state machine circuitry coupled to and responsive to the circuitry for performing the logical OR operation, the state machine circuitry outputting an edge sensitive interrupt signal.

4. The computer system of claim 3 wherein the state machine operates in a plurality of states, including a first state in which the state machine outputs an edge sensitive interrupt signal and a second state in which the state machine outputs no interrupt signal.

5. The computer system of claim 3 wherein the state machine operates according to the following state diagram:

wherein when the state machine is in the N1, N2 and N3 states the state machine circuitry outputs an edge sensitive interrupt signal, when the state machine is in the Delay state the state machine circuitry outputs no interrupt signal, the INT signal comprising an active result of the logical OR of the interrupt lines from the agents on the first I/O bus, the INTA signal comprising a signal from the CPU indicating that it is processing an interrupt.

6. The computer system of claim 3 wherein the state machine operates according to the following state diagram:

wherein when the state machine is in the N1, N2 and N3 states the state machine circuitry outputs an edge sensitive interrupt signal, the INT signal comprising an active result of the logical OR of the interrupt lines from the agents on the first I/O bus, the INTA signal comprising a signal from the CPU indicating that it is processing an interrupt, the R1, R2 and R3 states comprising successive state machine states where the state machine circuitry outputs no interrupt signal.

7. The computer system of claim 3 wherein said interrupt converter further comprises multiplexing logic coupled to said state machine circuitry for routing said edge sensitive interrupt signal to a selected interrupt input of said interrupt controller.

8. The computer system of claim 7 further comprising a programmable storage element coupled to said multiplexing logic for controlling said multiplexing logic, said multiplexing logic directing said edge sensitive interrupt to said selected interrupt input.

9. The computer system of claim 1 wherein said first bus standard comprises the Peripheral Component Interconnect (PCI) standard.

10. A level sensitive to edge sensitive interrupt converter for use in a computer system having a CPU, a first I/O bus having first peripheral agents that generate level sensitive interrupts, and a second I/O bus having second peripheral agents that generate edge sensitive interrupts, wherein said computer system includes an interrupt controller responsive to edge sensitive interrupts, the interrupt converter comprising:

circuitry for performing a logical OR operation of interrupt signals generated by the first peripheral agents; and logic circuitry coupled to and responsive to the circuitry for performing the logical OR operation for outputting an edge sensitive interrupt signal to said interrupt controller when a level sensitive interrupt signal is detected.

11. The interrupt converter of claim 10 wherein the logic circuitry includes a state machine operating according to the following state diagram:

wherein when the state machine is in the N1, N2 and N3 states the state machine circuitry outputs an edge sensitive interrupt signal, when the state machine is in the Delay state the state machine circuitry outputs no interrupt signal, the INT signal comprising an active result of the logical OR operation of the interrupt lines from the first peripheral agents, the INTA signal comprising a signal from the CPU indicating that it is processing an interrupt.

12. The interrupt converter of claim 10 wherein the logic circuitry includes a state machine operating according to the following state diagram:

wherein when the state machine is in the N1, N2 and N3 states the state machine circuitry outputs an edge sensitive interrupt signal, the INT signal comprising an active result of the logical OR operation of the interrupt lines from the first peripheral agents, the INTA signal comprising a signal from the CPU indicating that it is processing an interrupt, the R1, R2 and R3 states comprising successive state machine states where the state machine circuitry outputs no interrupt signal.

13. The interrupt converter of claim 10 wherein said interrupt converter further comprises state machine circuitry and multiplexing logic coupled to said state machine circuitry for routing said edge sensitive interrupt signal to a selected interrupt input of said interrupt controller.

14. The interrupt converter of claim 13 further comprising a programmable storage element coupled to said multiplexing logic for controlling said multiplexing logic to direct said edge sensitive interrupt to said selected interrupt input.

15. The interrupt converter of claim 10 wherein the logic circuitry includes a state machine that operates in a plurality of states, including a first state in which the state machine outputs an edge sensitive interrupt signal and a second state in which the state machine outputs no interrupt signal.

16. A method of processing interrupts in a computer system having a CPU, a first I/O bus having first peripheral agents that generate a first interrupt type, a second I/O bus having second peripheral agents that generate a second interrupt type, and an interrupt controller responsive to interrupts of the first interrupt type, said method comprising the steps of:

detecting interrupts of said second interrupt type;

generating an interrupt signal compatible with said first interrupt type responsive to a detected interrupt of said second interrupt type; and providing said interrupt signal compatible with said first interrupt type to said interrupt controller for interrupt handling.

17. The method of claim 16 wherein said first interrupt type comprises edge sensitive interrupts and said second interrupt type comprises level sensitive interrupts, said computer system including a state machine, said step of generating an interrupt signal compatible with said first interrupt type comprises the step of following the following state machine model:

wherein when the state machine is in the N1, N2 and N3 states the state machine model outputs an edge sensitive interrupt signal to the interrupt controller, when the state machine is in the Delay state the state machine circuitry outputs no interrupt signal, the INT signal comprising an active result of the logical OR operation of the interrupt lines from the second peripheral agents, the INTA signal comprising a signal from the CPU indicating that it is processing an interrupt.

18. The method of claim 16 wherein said first interrupt type comprises edge sensitive interrupts and said second interrupt type comprises level sensitive interrupts, said computer system including a state machine, said step of generating an interrupt signal compatible with said first interrupt type comprises the step of following the following state machine model:

wherein when the state machine is in the N1, N2 and N3 states the state machine model outputs an edge sensitive interrupt signal to the interrupt controller, the INT signal comprising an active result of the logical OR operation of the interrupt lines from the second peripheral agents, the INTA signal comprising a signal from the CPU indicating that it is processing an interrupt, the R1, R2 and R3 states comprising successive state machine states where the state machine circuitry outputs no interrupt signal.

19. The method of claim 16 further comprising the step of storing control bits identifying a selected interrupt input to said interrupt controller.

20. The method of claim 19 wherein said step of providing said interrupt signal to said interrupt controller comprises providing said interrupt signal to said selected interrupt input responsive to said control bits.

21. A level sensitive to edge sensitive interrupt converter for use in a computer system having a central processing unit, a first I/O bus having agents that generate level sensitive interrupts, and a second I/O bus having agents that generate edge sensitive interrupts, wherein said computer system includes an interrupt controller responsive to edge sensitive interrupts, the interrupt converter comprising:

circuitry configured to receive interrupt signals from said first I/O bus;

conversion circuitry configured to convert said interrupt signals from said first I/O bus to edge sensitive interrupt signals; and circuitry configured to provide said edge sensitive interrupt signals to said interrupt controller.

22. The interrupt converter of claim 21 wherein said level sensitive interrupts comprise PCI compatible interrupt signals and said edge sensitive interrupts comprise ISA/EISA compatible interrupt signals.

* * * * *